Jan. 31, 1956        A. ASHLEY ET AL        2,732,851
               VALVE DEVICES FOR HYDRAULIC MECHANISMS
Filed Feb. 10, 1954                         2 Sheets-Sheet 1
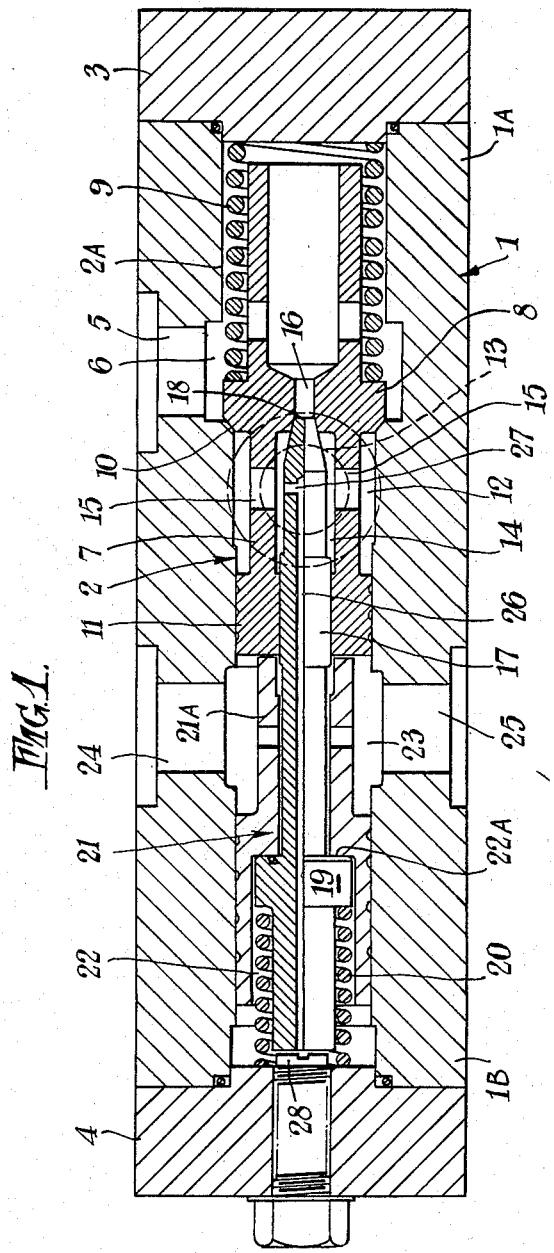

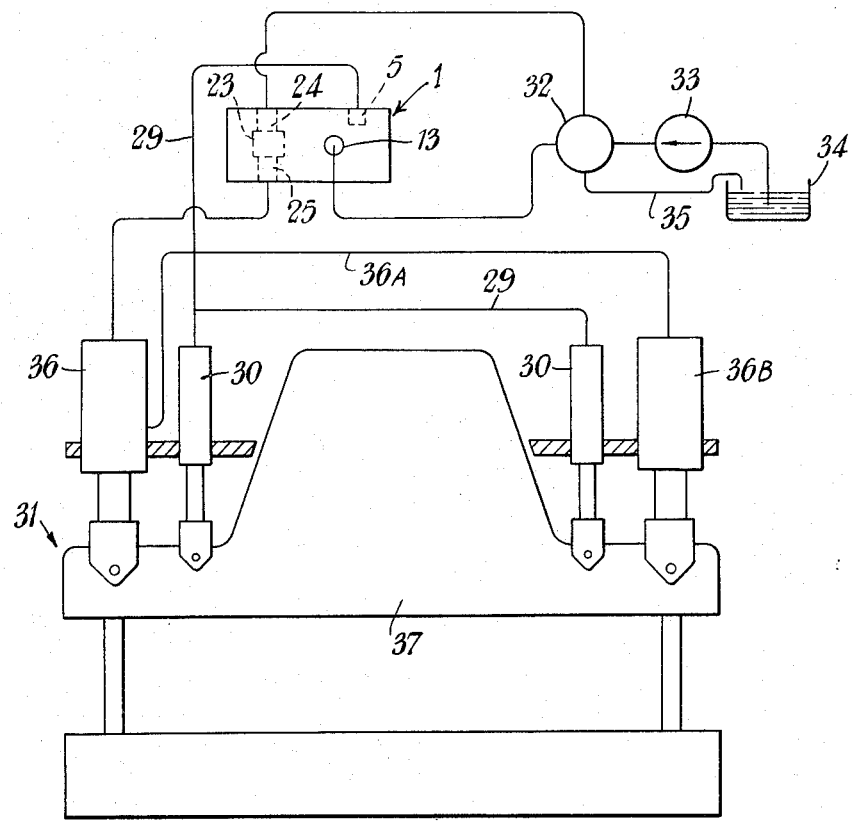

United States Patent Office 2,732,851
Patented Jan. 31, 1956

2,732,851

VALVE DEVICES FOR HYDRAULIC MECHANISMS

Allan Ashley and Ronald Fletcher Watson, Westminster, London, England, assignors to Vickers-Armstrongs Limited, London, England, a British company Application February 10, 1954, Serial No. 409,452

Claims priority, application Great Britain February 11, 1953

6 Claims. (Cl. 137—102)

This invention relates to valve devices for hydraulic systems.

According to the present invention there is provided a valve device for a hydraulic system, the valve device comprising a first non-return valve for allowing liquid to flow into said system, a second non-return valve for allowing liquid to flow from said system, and means responsive to a control pressure, said second valve being arranged to be operated by the responsive means to open to allow liquid to flow from the system when the control pressure is exceeded.

For a better understanding of the invention and the method of carrying the same into effect reference will now be made to the accompanying drawings in which Figure 1 shows a longitudinal cross-section of a valve device, and Figure 2 shows diagrammatically a hydraulic system employing the valve device of Figure 1.

The valve device comprises a body member 1 having a circular sectioned bore 2 longitudinally therethrough, the body member 1 being closed at each end by cover plates 3, 4. A port 5 through the wall of the body member 1 communicates with an annular groove 6 within the member 1. The port 5 and the groove 6 are located adjacent the end 1A of the body member. A plunger 7 having a valve head 8 disposed within the annular groove 6, is located in the bore 2. A spring 9 is disposed between the valve head 8 and the cover plate 3 for urging the valve head 8 against a seating 10 formed by that side of the annular groove 6 that is remote from the end 1A. At its end remote from the head 8, the plunger 7 has a piston 11 co-operating with the bore 2. An annular groove 12 is formed around the central part of the plunger 7 and this groove 12 communicates with a port 13 through the wall of the body member 1. The plunger 7 has a chamber 14 therein, which latter communicates by way of radially directed ports 15 with the annular groove 12 in the plunger 7. A passageway 16 leads from the chamber 14 through the valve head 8 to the part 2A of the bore 2, at the end 1A of the body member 1. The passageway 16 can therefore effect communication between the groove 12 and the port 5.

A valve spindle 17 disposed axially within the body member 1 extends from adjacent the end 1B of the body member 1, through the piston 11 to the chamber 14 and has a conical shaped valve head 18 for opening and closing the passageway 16. The valve spindle 17 has a collar 19 thereon and a spring 20 is disposed between this collar 19 and the cover plate 4.

A further piston 21 disposed around the spindle 17 is located within the bore 2. This further piston 21 has at one end thereof a reduced diameter portion 21A which latter can abut against the piston 11. At the other end the further piston 21 has a recess 22 in which the collar 19 and the spring 20 are accommodated. The bottom 22A of the recess 22 can abut against the collar 19 to move the valve spindle 17 against the action of the spring 20. Around the portion 21A of the further piston 21, an annular space 23 is formed within the body member 1, which annular space 23 communicates with ports 24, 25 formed through the body member 1.

The spindle 17 has a longitudinal hole 26 therethrough, the hole 26 extending from near the conical shaped valve head 18 to the other end of the spindle 17. Radially directed holes 27 through the spindle 17 permit communication between the chamber 14 and said longitudinal hole 26.

The valve device described above is preferably used as the holding and check valve of the hydraulic mechanism described in co-pending patent application No. 409,451, filed February 10, 1954. When so employed the port 5 is connected, by conduits 29 (Figure 2), to the pull-back jacks 30 of a press 31, the port 13 communicates with a four-way valve 32 to receive liquid from a pump 33, or to return liquid to a tank 34 by way of a conduit 35. The port 25 communicates with a primary main jack 36 which serves for pressing down the slide 37 of the press 31, and the port 24 communicates with the four-way valve 32 to receive liquid from the main pump 33 or to return liquid to the tank 34. The primary main jack 36 is connected by a conduit 36A to a secondary main jack 36B. When there is no significant pressure in the primary main jack 36 there is no significant pressure on the liquid in the annular space 23. The spring 9 presses the valve head 8 onto its seating 10 and the spring 20 causes the conical shaped valve head 18 to close the passageway 16. Hence no liquid can flow from the pull-back jacks 30 since the port 5 leads to a closed chamber formed by the part 2A of the bore 2. Thus the slide 37 of the press is prevented from descending. Should, however, an excessive overload of pressure occur in the pull-back jacks 30, the pressure in the part 2A of the bore 2 will rise sufficiently to cause the valve spindle 17 to be moved to the left against the action of said spring 20 thereby to open the passageway 16 whereby liquid can leak from the pull-back jacks 30 through the port 5, through the passageway 16, through the chamber 14, through the radially directed ports 15, through the port 13 and thence to the four-way valve 32 and the drain tank 34.

When the four-way valve 32 is operated to deliver pressure fluid from the pump 33 to the primary main jack 36, the pressure of the liquid in the annular space 23 rises and the piston 21 moves towards the end 1B of the body member 1 carrying with it the valve spindle 17 which is moved against the action of the spring 20. This movement of the valve spindle 17 opens the passageway 16 and liquid flows from the pull-back jacks 30 through the port 5, the passageway 16 to the port 13 and thence to the four-way valve 32 and the drain tank 34. The extent of movement of the valve spindle 17 may be limited by an adjustable stop 28 which consists of a threaded bolt passing through the end cover 4. The extent of movement of the valve spindle 17 on the opening movement partly determines the rate at which liquid can pass through the passageway 16 and hence controls the rate at which the slide 37 of the press 31 descends. It should be noted that the leak-off valve comprising the passageway 16 and said conical shaped valve head 18 only partially controls the descent of the slide 37, the speed of descent being dependent inter alia on the rate at which liquid is pumped into the primary main jack 36.

During the downward movement of the slide 37, before it contacts the work the pressure in the annuluar space 23 is insufficient to cause the plunger 7 to be deflected against the force on the other end of the plunger due to the spring 9 and the pressure of the liquid on the valve head 8.

During the downward movement of the slide 37, as pressure rises in the primary jack 36 while the latter is exerting effort on the work, the pressure in the space 23 rises sufficiently to move the piston 21 towards the end 1B and to force the plunger 7 towards the end 1A, consequently opening wide the passageway 16 and lifting the valve head 8 from the seating 10, thereby allowing free passage of liquid from the pull-back jacks 30 and so relieving back pressure from the slide 37, enabling the full force on the slide to be utilised.

When it is desired to raise the slide 37, the four-way valve 32 connects the port 24 to the drain tank 34 and delivers pressure liquid to said port 13. The liquid entering through the port 13 passes through the radially directed ports 15 to the chamber 14 and then through said radially directed holes 27 in the valve spindle 17 to the longitudinal hole 26 and thence to the end 1B of the body member. The further piston 21, due to the rise in pressure on the end thereof adjacent the cover plate 4 is moved towards the end 1A of the body member 1. The reduced portion 21A of the further piston 21 abuts against the plunger 7 and moves the plunger towards the end 1A whereby the valve head 8 is lifted off its seating 10 and the liquid entering the port 13 can then pass freely along the bore 2 to the port 5 and thence to the pull-back jacks 30.

We claim:

1. A valve device for a hydraulic system that includes a controlled part and a hydraulic supply part, the valve device comprising a first valve for allowing liquid to flow into the controlled part of said system, the first valve having a first inlet and a first outlet, a second valve for allowing liquid to flow from the controlled part of said system, the second valve having a second inlet and a second outlet, the first inlet communicating with the second outlet and the second inlet communicating with the first outlet, a first pressure-responsive means communicating with the first inlet and responsive to the liquid pressure therein for controlling the first valve to open the same when liquid is fed to the first inlet, a second pressure-responsive means arranged to have a control pressure communicated thereto and controlling the second valve to open the latter when the control pressure exceeds a first predetermined value, and means responsive to said control pressure for opening the first valve when the control pressure exceeds a second predetermined value which is greater than said first value.

2. A valve device as claimed in claim 1, wherein the valve opening of the second valve as compared with that of the first valve is relatively small so that liquid can only flow through the second valve at a restricted rate.

3. A valve device as claimed in claim 1, including spring means urging the second valve toward closed position and acting against the pressure of the liquid at the second inlet, whereby upon the occurrence of a predetermined overload pressure in the controlled part of said system the second valve will open against the opposition of the spring means.

4. A valve device for a hydraulic system, the device comprising a body member having a bore therethrough, the bore being closed at each end, a plunger slidably located in the bore, an annular shoulder in the bore, the shoulder forming a valve seat and opening, a valve head on the plunger, a first spring urging the valve head against said shoulder, a port in the body member leading from the part of the bore in which the valve head operates, the port serving for communication with said system, a chamber within said plunger, a passageway through said plunger for providing communication between said chamber and port, a needle valve slidably carried in said plunger and co-operating with said passageway, the needle valve extending through the end of the plunger remote from the valve head, a first piston on said end of said plunger slidable along said bore, a second piston located in the bore adjacent the first piston, a first inlet in the body member leading to the portion of the bore between the two pistons, a connection between the second piston and the part of the needle valve extending from the plunger, a second spring urging the needle valve to close said passageway, a second inlet in the body member communicating firstly with the portion of the bore between the valve head and the first piston and secondly with said chamber in the plunger, and means for lifting the valve head from the shoulder when liquid is fed to second inlet, the first inlet serving for connection to a control pressure source, the strength of the second spring as compared with that of the first spring being such that when the control pressure exceeds a first predetermined value the needle valve is retracted from said passageway to allow liquid to flow from said system and such that when the control pressure exceeds a second predetermined value that is greater than the first, the valve head is lifted from the shoulder to allow liquid to flow from said system in addition via said valve opening.

5. A valve device according to claim 4, wherein the means for lifting the valve head comprises an extension on the second piston for abutting against the first piston, and a conduit in the needle valve leading from the chamber in the plunger to the part of the bore between said second piston and the end of the body remote from the valve head.

6. A valve device according to claim 4, wherein the needle valve includes a lateral projection that is urged against the second piston by the second spring, whereby movement of the second piston towards that end of the body member remote from the valve head causes corresponding movement of the needle valve, but movement of the needle valve towards said end of the body member does not cause corresponding movement of the second piston.

References Cited in the file of this patent

UNITED STATES PATENTS

| | | |
|---|---|---|
| 2,367,682 | Kehle | Jan. 23, 1945 |
| 2,375,411 | Grant | May 8, 1945 |
| 2,459,664 | Majneri | Jan. 18, 1949 |
| 2,604,327 | Kukham | July 22, 1952 |